US012640816B2

(12) United States Patent (10) Patent No.: US 12,640,816 B2
Tanaka (45) Date of Patent: May 26, 2026

(54) OPTICAL DEVICE AND OPTICAL MODULE

(71) Applicant: FUJITSU OPTICAL COMPONENTS LIMITED, Kawasaki (JP)

(72) Inventor: Hiromasa Tanaka, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 274 days.

(21) Appl. No.: 18/603,992

(22) Filed: Mar. 13, 2024

(65) Prior Publication Data

US 2024/0356649 A1      Oct. 24, 2024

(30) Foreign Application Priority Data

Apr. 18, 2023     (JP) .................................. 2023-067838

(51) Int. Cl.
  *H04B 10/40*          (2013.01)
  *G02B 27/28*          (2006.01)
  *H04J 14/02*          (2006.01)

(52) U.S. Cl.
  CPC ........... *H04B 10/40* (2013.01); *G02B 27/286* (2013.01); *H04J 14/02* (2013.01)

(58) Field of Classification Search
  None
  See application file for complete search history.

(56) References Cited

U.S. PATENT DOCUMENTS 5,546,212 A * 8/1996 Kunikane ............ G02B 6/4246
                                              385/47
6,327,063 B1 * 12/2001 Rockwell ............. H04B 10/118
                                              398/128

7,361,884 B2 * 4/2008 Tanaka .................... G02F 1/093
                                              385/11
7,594,766 B1   9/2009 Sasser et al.
7,853,104 B2 * 12/2010 Oota .................. G01M 11/3127
                                              385/11
10,634,844 B1   4/2020 Lin et al.
11,190,293 B1 * 11/2021 Ducellier ............ H04J 14/0227
11,486,975 B1 * 11/2022 Xiao ........................ G01S 17/89
2025/0096900 A1 * 3/2025 Chen ........................ H04J 14/06

FOREIGN PATENT DOCUMENTS

JP            7-191241          7/1995
JP          2004-117793        4/2004

* cited by examiner

*Primary Examiner* — Jai M Lee
(74) *Attorney, Agent, or Firm* — STAAS & HALSEY LLP

(57) ABSTRACT

A device includes an emitter that emits transmission light with P polarization, a receiver that receives reception light, a transmission port that outputs the transmission light, a reception port that inputs the reception light, and an adjuster that polarizes the reception light received to S polarization. The device includes a filter that outputs the transmission light with P polarization received from the emitter by allowing the transmission light to propagate through inside a propagation path, and that outputs the reception light with S polarization received from the adjuster by allowing the reception light to propagate through inside the path. The device includes a polarizer that is arranged between the filter and the emitter and between the filter and the receiver, outputs the transmission light with P polarization received from the emitter to the filter, and outputs the reception light with S polarization received from the filter to the receiver.

10 Claims, 13 Drawing Sheets

OPTICAL DEVICE AND OPTICAL MODULE

CROSS-REFERENCE TO RELATED APPLICATION

This application is based upon and claims the benefit of priority of the prior Japanese Patent Application No. 2023-067838, filed on Apr. 18, 2023, the entire contents of which are incorporated herein by reference.

FIELD

The embodiments discussed herein are related to an optical device and an optical module.

BACKGROUND

With an increase in communication demand in recent years, a higher-speed and larger-capacity communication network is accelerated in a market for an optical fiber communication network, and, high-speed and large-capacity optical transmission at, for example, 100 Gbps, 400 Gbps, or the like is possible. An optical module is used as one of components that constitute such an optical fiber communication network.

As the optical module, with expansion of the network market, a plurality of Form Factor optical modules including a C Form-factor Pluggable (CFP), a CFP2, a CFP4, a Quad Small Form-factor Pluggable 28 (QSFP28), and the like are present. For example, an optical module conforming to 100 Gbps is categorized into LR (10 km), ER (40 km), and the like in accordance with a distance available for transmission of an optical signal, and also, as a modulation technique, there are a binary modulation technique, a four-valued modulation technique, and the like.

FIG. 12 is an explanation diagram illustrating one example of an optical module 100. The optical module 100 illustrated in FIG. 12 includes a Transmitter Optical Sub-Assembly (TOSA) 110, a Receiver Optical Sub Assembly (ROSA) 120, and a control circuit 130. The TOSA 110 is optically connected to a transmission side optical fiber 140A. The TOSA 110 is a transmitting circuit that converts, for example, 4-channel electrical signals to 4-wavelength optical signals having different wavelengths and that outputs the converted optical signals from the transmission side optical fiber 140A. The ROSA 120 is optically connected to a reception side optical fiber 140B. The ROSA 120 is a receiving circuit that converts the 4-wavelength optical signals that have been input from the reception side optical fiber 140B and that have different wavelengths to the 4-channel electrical signals and that outputs the converted optical signals. The control circuit 130 controls the TOSA 110 and the ROSA 120.

Figure 13:
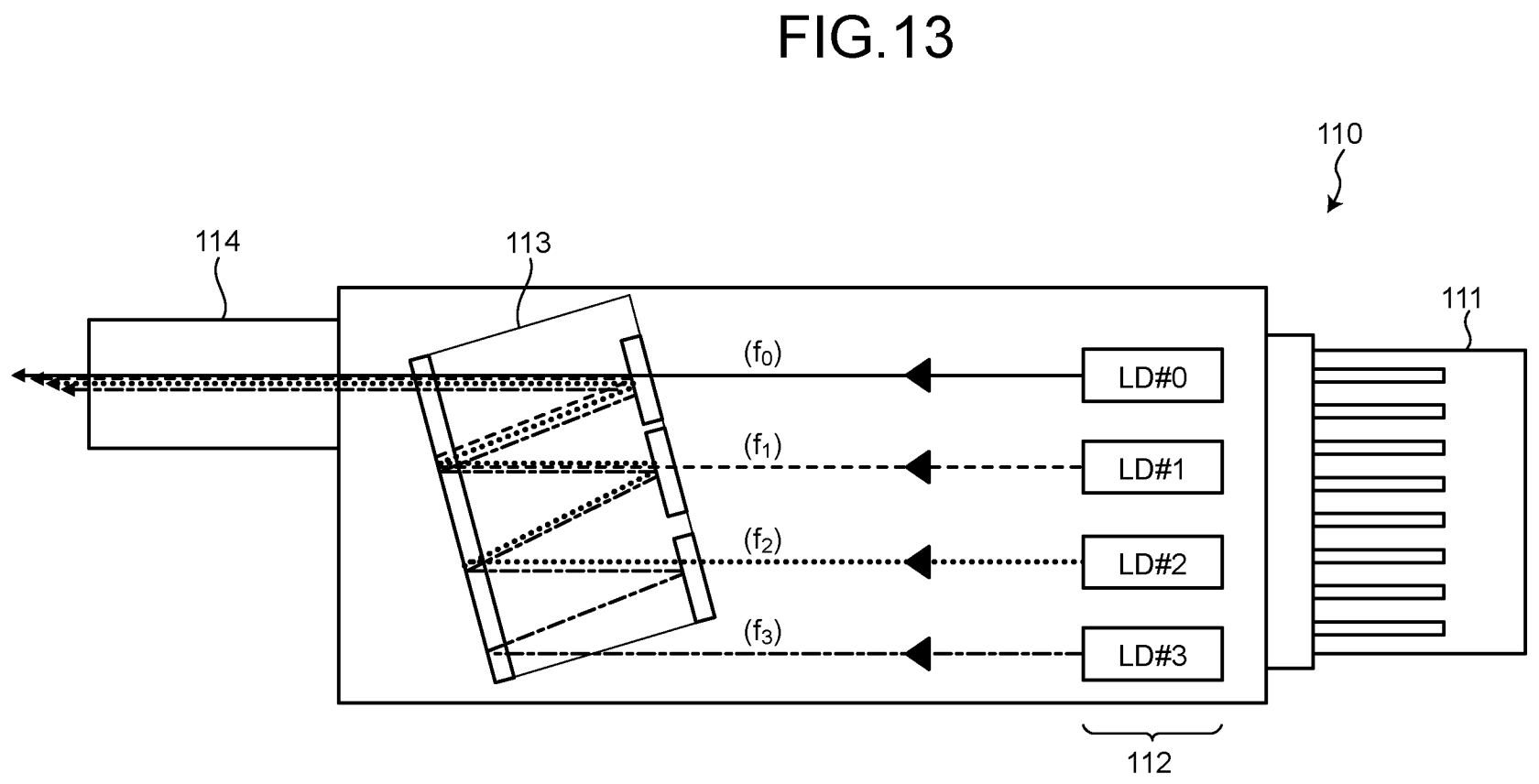

FIG. 13 is an explanation diagram illustrating one example of the TOSA 110. The TOSA 110 illustrated in FIG. 13 includes an input unit 111, a light emitting unit 112, an optical multiplexer 113, a transmission port 114A, and a transmission side receptacle 114. Furthermore, it is assumed that each of the light emitting unit 112 and the optical multiplexer 113 are constituted by optical parts and it is assumed that the optical parts include a Thermo Electric Cooler (TEC) that is not illustrated. The input unit 111 inputs the electrical signal received from the control circuit 130 to each of four Laser-Diodes (LDs) that are included in the light emitting unit 112. The light emitting unit 112 includes the four LDs each of which oscillates light having a different wavelength, that is, an LD that is denoted by #0 and that oscillates transmission light having a wavelength λ0, an LD that is denoted by #1 and that oscillates transmission light having a wavelength λ1, an LD that is denoted by #2 and that oscillates transmission light having a wavelength λ2, and an LD that is denoted by #3 and that oscillates transmission light having a wavelength λ3. The input unit 111 inputs an electrical signal to each of the LDs denoted by #0 to #3. The optical multiplexer 113 is an optical multiplexing element that multiplexes the pieces of transmission light having different wavelengths associated with the respective LDs that are included in the light emitting unit 112. The transmission port 114A is a port that is optically connected to the transmission side optical fiber 140A by way of the transmission side receptacle 114 and that outputs the transmission light that has been multiplexed by the optical multiplexer 113. The transmission side receptacle 114 is a joining part that is constituted in order to optically connect the transmission side optical fiber 140A and the transmission port 114A. Furthermore, for convenience of description, a light traveling direction in which the transmission light emitted from each of the LDs travels indicated by (f0) to (f3) illustrated in FIG. 13 is indicated by a black triangle, and a ray of light travelling is indicated by a line.

Figure 14:
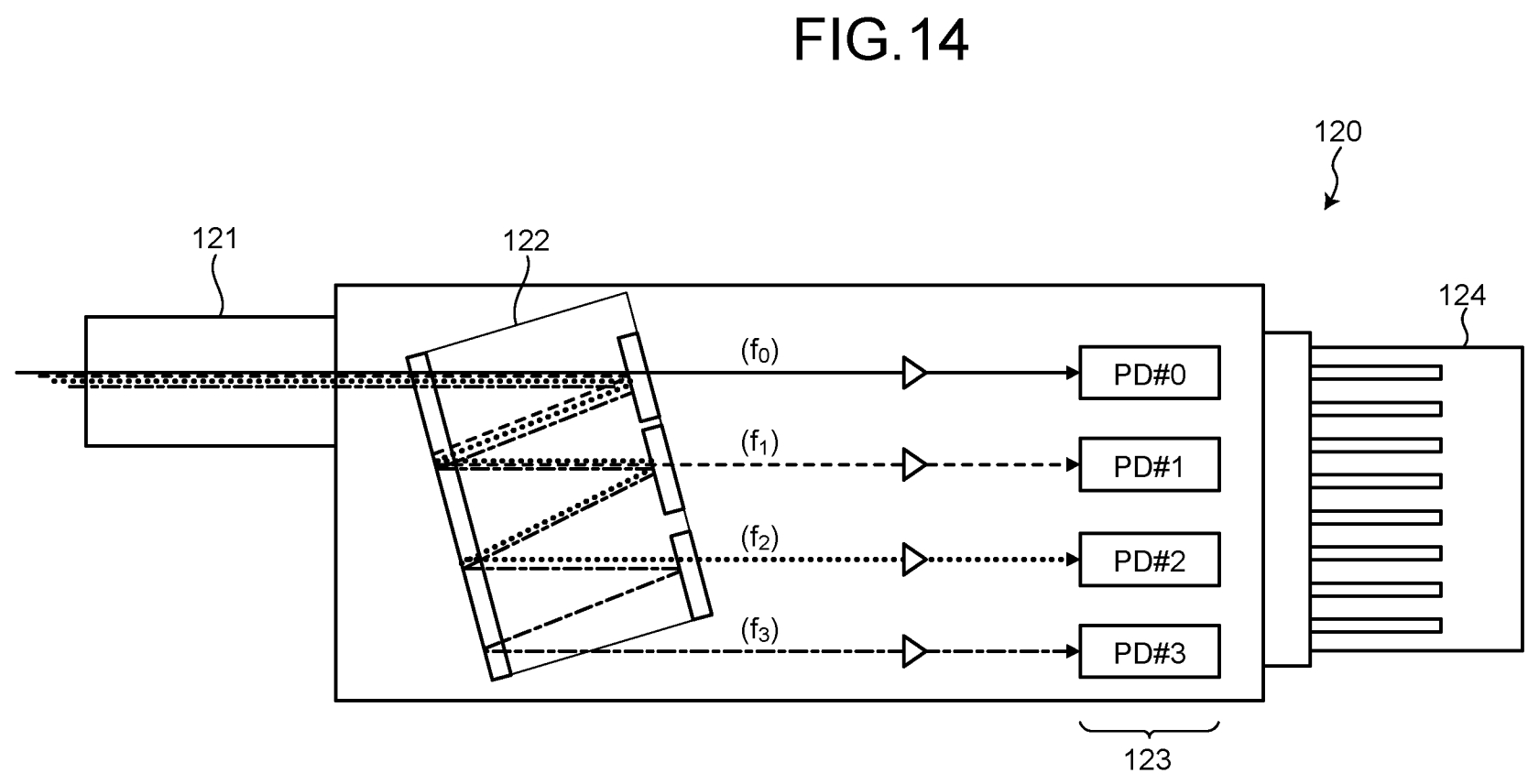

FIG. 14 is an explanation diagram illustrating one example of the ROSA 120. The ROSA 120 illustrated in FIG. 14 includes a reception side receptacle 121, a reception port 121A, an optical demultiplexer 122, a light receiving unit 123, and an output unit 124. Furthermore, it is assumed that each of the optical demultiplexer 122 and the light receiving unit 123 are constituted by optical parts and it is assumed that the optical parts include a Trans-Impedance Amplifier (TIA) that is not illustrated. The light receiving unit 123 illustrated in FIG. 14 includes four Photo-Diodes (PDs) that receive pieces of light having different wavelengths, that is, a PD that is denoted by #0 and that receives reception light having the wavelength λ0, a PD that is denoted by #1 and that receives reception light having the wavelength λ1, a PD that is denoted by #2 and that receives reception light having the wavelength λ2, and a PD that is denoted by #3 and that receives reception light having the wavelength λ3. The output unit 124 outputs, to the control circuit 130, the electrical signal that has been subjected to photoelectric conversion by each of the PDs that are included in the light receiving unit 123. The reception side receptacle 121 is a joining part that is constituted in order to optically connect the reception side optical fiber 140B and the reception port 121A that is included in the ROSA 120. The reception port 121A is a port that is optically connected to the reception side optical fiber 140B by way of the reception side receptacle 121, and that inputs the reception light having random polarization directions received from the reception side optical fiber 140B. The optical demultiplexer 122 demultiplexes the reception light received from the reception port 121A into pieces of light having different wavelengths λ0 to λ3, and outputs the pieces of demultiplexed light to the respective PDs in accordance with the respective wavelengths. Furthermore, for convenience of description, a light traveling direction in which each of the pieces of reception light indicated by (f0) to (f3) illustrated in FIG. 14 is indicated by a white triangle, and a ray of light traveling is indicated by a line.

Furthermore, the control circuit 130 is provided on a substrate in which, circuits having various functions including, for example, each of device control purpose ICs that control the TOSA 110 and the ROSA 120, a power supply purpose IC, various kinds of monitor circuits, a filter circuit, and the like are arranged by a plurality of ICs and a lot of passive parts and are electrically connected.

Patent Document 1: Japanese Laid-open Patent Publication No. 7-191241

Patent Document 2: Japanese Laid-open Patent Publication No. 2004-117793

Patent Document 3: U.S. Pat. No. 7,594,766

Patent Document 4: U.S. Pat. No. 10,634,844

In the beginning of the start of an optical fiber communication network performed at, for example, 100 Gbps, a CFP module was the mainstream for the optical module, and, after that, Form Factors referred to as the CFP2 and the CFP4 appear, and, currently, a QSFP module is the mainstream. The differences of these Form Factors make difference in specifications of optical module in various respects including not only the size of the own optical module but also electrical power consumption, specifications of an external interface, specifications of internal ROM data, and the like. In particular, the size of the optical module is significantly changed.

For example, a housing size of the CFP module is relatively large with the size of (length: fiber direction)×(width)×(height)≈13 cm×7.5 cm×1.4 cm. In contrast, the housing size of the QSFP module corresponding to the current mainstream is (length)×(width)×(height)≈5.2 cm×1.8 cm×0.85 cm, and is thus relatively smaller than the CFP module. Therefore, a volume ratio is CFP:QSFP≈16:1, and the volume of the QSFP module has been consequently reduced to about one sixteenth, and, when focusing on the area (length)×(width) of the module, an area ratio is CFP:QSFP≈10:1, and the area of the QSFP module has been consequently reduced to about one tenth.

In contrast, although it is a rough estimate, the housing area of each of the TOSA 110 and the ROSA 120 is about (length)×(width)≈2 cm×0.7 cm, and, even though the mainstream of the optical module has been changed from the CFP to the QSFP, the size of each of the TOSA 110 and the ROSA 120 itself is not greatly changed. The reason for this is that, there was no request for a change in a package size in terms of the internal configuration of each of the TOSA 110 and the ROSA 120 and the main electro-optical properties.

However, in recent years, it is demanded that a Semiconductor Optical Amplifier (SOA) be installed inside the TOSA 110 or the ROSA 120, and, there is a need to expand the size of each of the TOSA and the ROSA that are used in this case in the longitudinal direction.

Furthermore, there is a scheme of an optical module (400GBASE-FR8/LR8) in which wavelength multiplexing is further advanced such that the number of wavelengths for multiplexing has been expanded to, for example, eight wavelengths instead of four wavelengths. In this case, the number of each of LDs and PDs also increases from four to eight, so that the package size of each of the TOSA 110 and the ROSA 120 itself also increases. Therefore, from now on, although depending on an application, it is expected that the housing size of each of the TOSA 110 and the ROSA 120 tends to increase.

In this way, generational change in Form Factor from the CFP to the QSFP progresses with maturation of the optical fiber communication network, the size of the optical module itself tends to be reduced, whereas, the size of each of the TOSA 110 and the ROSA 120 that are optical parts tends to be increased. Therefore, the area of the control circuit 130 is getting smaller in accordance with expansion tendency of the size of each of the TOSA 110 and the ROSA 120.

Accordingly, a designer of the optical module 100 needs to arrange a plurality of ICs and a lot of passive parts in a limited space of the substrate included in the control circuit 130, and needs to design by giving priority to the scale of the circuit and the size of the parts even at the cost of the circuit properties and the parts properties. In other words, if the substrate area of the control circuit 130 is reduced, for the designer, a degree of freedom in the design is decreased due to strict constraint of the scale of the circuit and the size of the parts.

It is conceivable to take countermeasure against these problems by arranging parts on both of the upper and lower surfaces of the substrate, by adopting a structure in which two substrates are vertically arranged, or the like in order to expand the substrate area of the control circuit 130, but, even so, the substrate area of the control circuit 130 is insufficient, which is the actual situation.

If it is possible to expand the substrate area of the control circuit 130, constraint of the scale of the circuit and the size of the parts is alleviated, the degree of freedom for a design is obviously increased. However, in order to expand the substrate area of the control circuit 130, there is a need to increase the size of the optical module itself or reduce the size of the optical parts in the TOSA 110 and the ROSA 120. Accordingly, it is demanded that the substrate area of the control circuit 130 be expanded by implementing a reduction in the size of the optical parts.

SUMMARY

According to an aspect of an embodiment, an optical device includes a light emitter, a light receiver, a transmission port, a reception port, a polarization adjuster, an optical filter and a polarizer. The light emitter emits transmission light that is in a first linearly polarized light state. The light receiver receives reception light. The transmission port outputs the transmission light. The reception port inputs the reception light. The polarization adjuster polarizes the reception light received from the reception port to a second linearly polarized light state that has an orthogonal relationship with the first linearly polarized light state. The optical filter outputs the transmission light that has been received from the light emitter and that is in the first linearly polarized light state by allowing the transmission light to propagate through inside a propagation path, and outputs the reception light that has been received from the polarization adjuster and that is in the second linearly polarized light state by allowing the reception light to propagate through inside the propagation path. The polarizer is arranged between the optical filter and the light emitter and between the optical filter and the light receiver, outputs the transmission light that has been received from the light emitter and that is in the first linearly polarized light state to the optical filter, and outputs the reception light that has been received from the optical filter and that is in the second linearly polarized light state to the light receiver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

Figure 9:
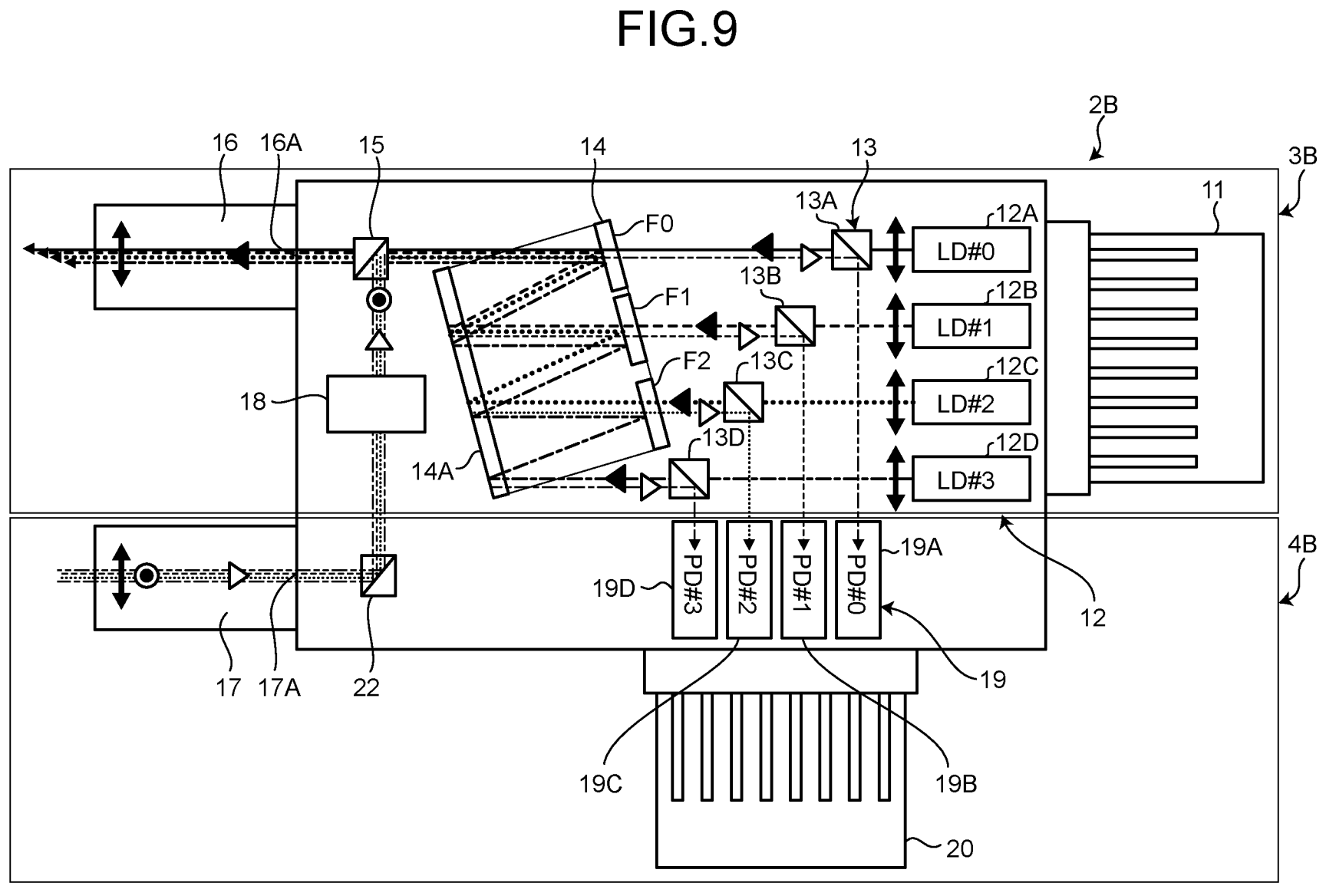

FIG. 9 is an explanation diagram illustrating one example of a TOSA and a ROSA that are included in the OSA according to the third embodiment;

FIG. 10 is an explanation diagram illustrating one example of an OSA according to a fourth embodiment;

Figure 11:
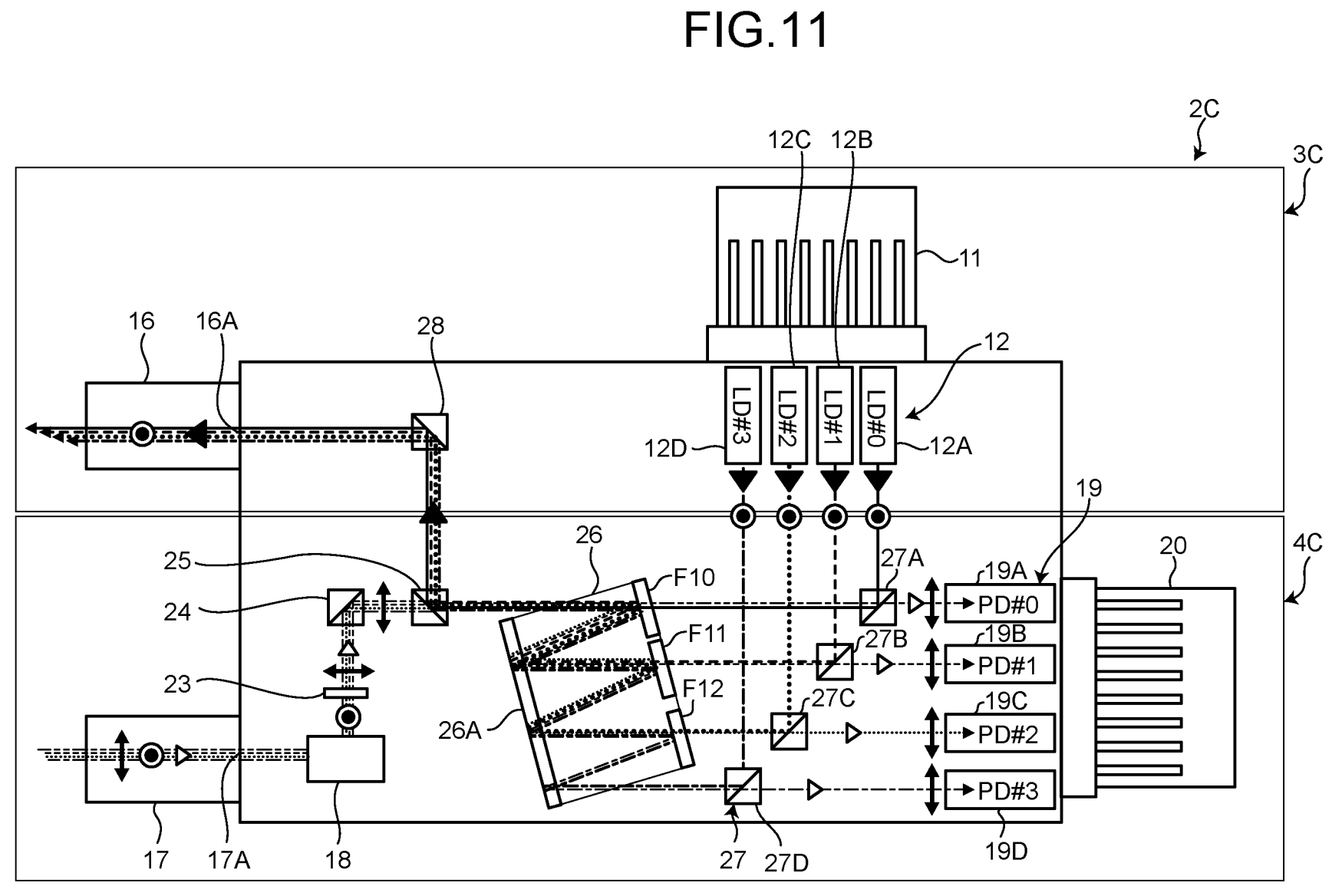

FIG. 11 is an explanation diagram illustrating one example of a TOSA and a ROSA that are included in the OSA according to the fourth embodiment;

FIG. 13 is an explanation diagram illustrating one example of a TOSA; and

FIG. 14 is an explanation diagram illustrating one example of a ROSA.

DESCRIPTION OF EMBODIMENTS

Preferred embodiments of the present invention will be explained with reference to accompanying drawings. Furthermore, the present invention is not limited to the embodiments. In addition, the embodiments described below may also be used in any appropriate combination as long as the embodiments do not conflict with each other.

(a) First Embodiment

Figure 1:
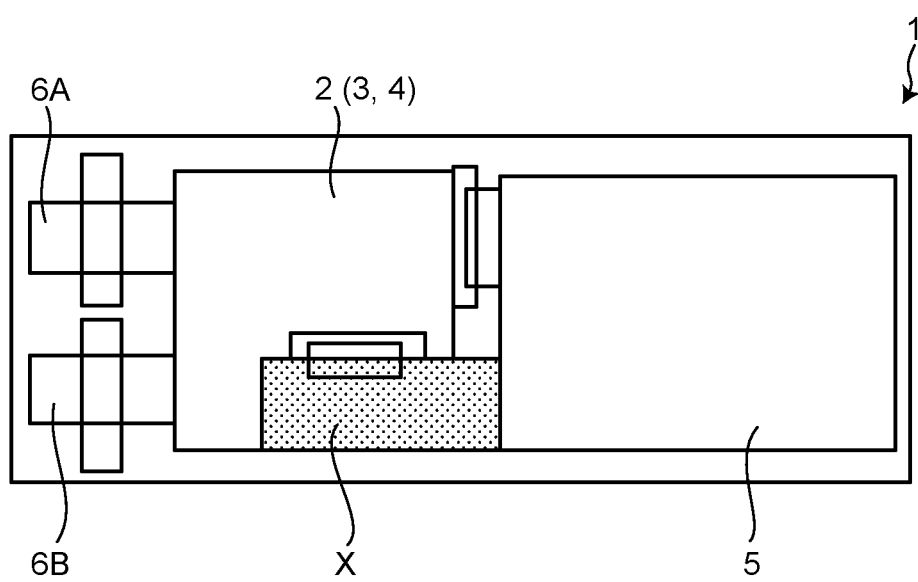
FIG. 1 is an explanation diagram illustrating one example of an optical module according to the present embodiment.

FIG. 1 is an explanation diagram illustrating one example of an optical module 1 according to the present embodiment. The optical module 1 illustrated in FIG. 1 includes an Optical Sub-Assembly (OSA) 2 and a control circuit 5. The OSA 2 includes a Transmitter Optical Sub-Assembly (TOSA) 3 and a Receiver Optical Sub Assembly (ROSA) 4. The TOSA 3 is a transmitting circuit that converts electrical signals having, for example, four channels to optical signals having four wavelengths each having a different wavelength and that outputs the converted optical signals. The ROSA 4 is a receiving circuit that converts the 4-wavelength optical signals having the four wavelengths each having a different wavelength to electrical signals having four channels and that outputs the converted electrical signals. The control circuit 5 controls the TOSA 3 and the ROSA 4 that are included in the OSA 2. The TOSA 3 is optically connected to a transmission side optical fiber 6A. The ROSA 4 is optically connected to a reception side optical fiber 6B. Although described later, it is possible to expand, in the control circuit 5, the area indicated by a shaded area X by reducing the size of the OSA 2.

Figure 2:
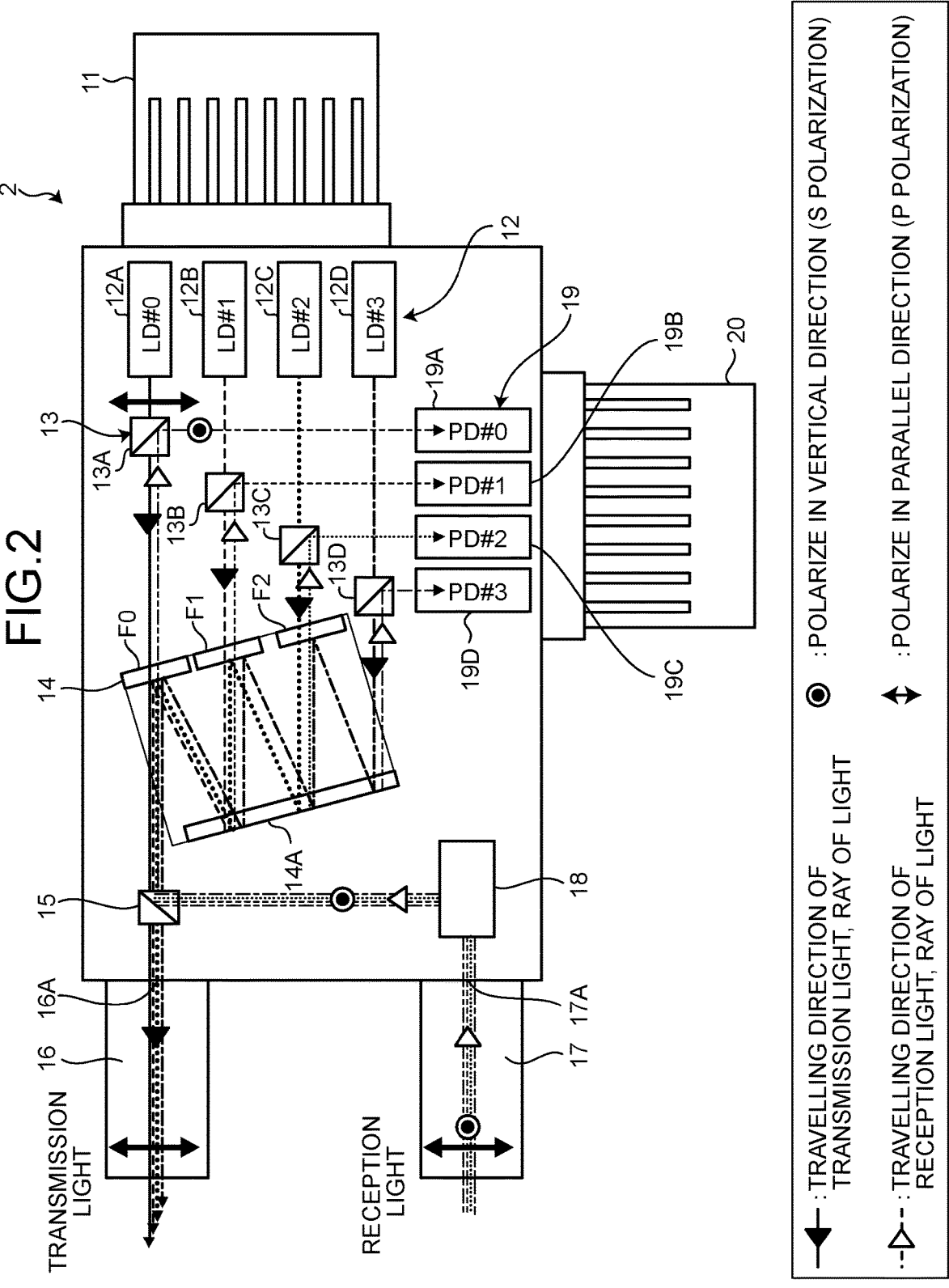
FIG. 2 is an explanation diagram illustrating one example of an OSA according to a first embodiment.
Figure 3:
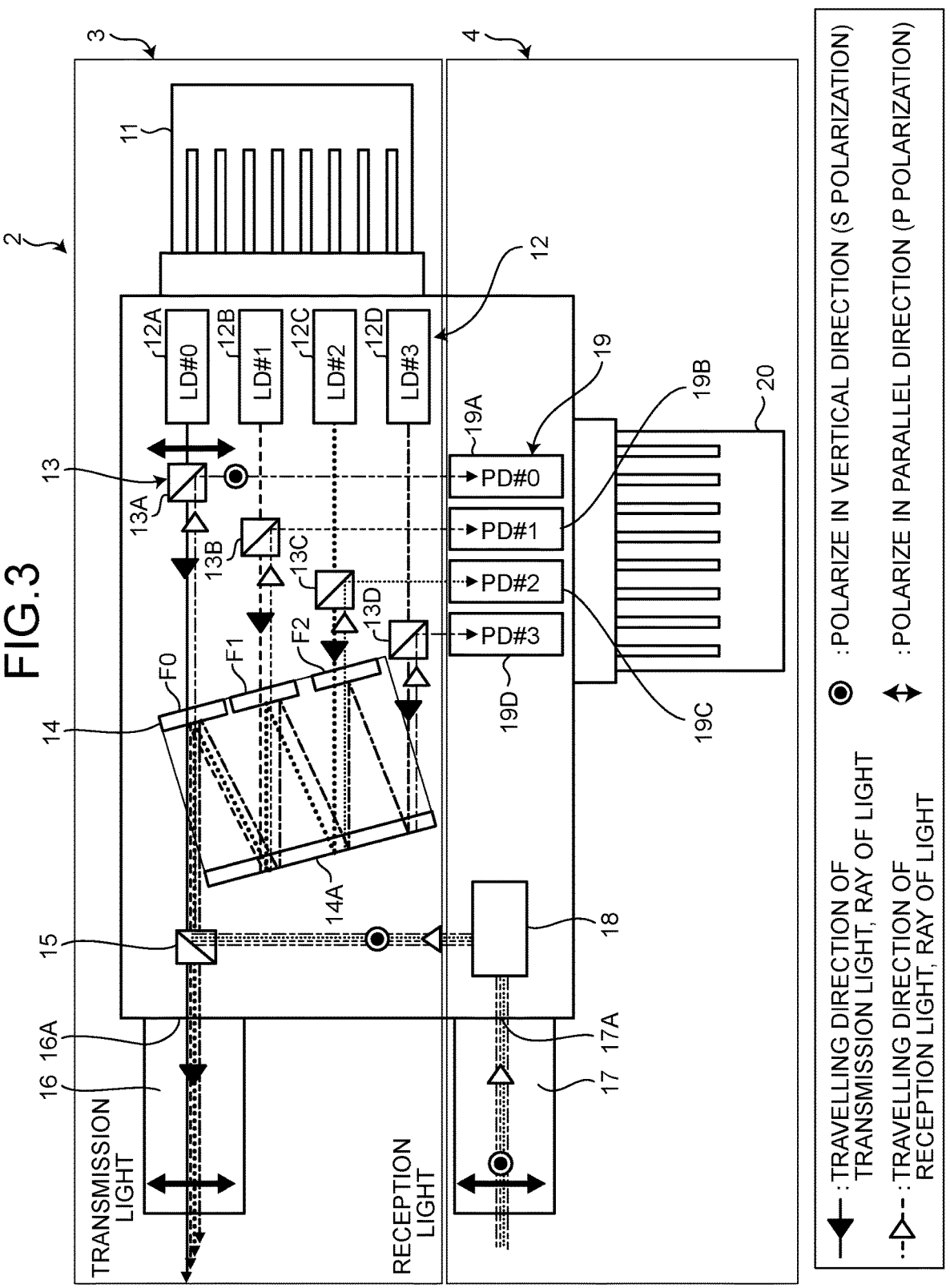
FIG. 3 is an explanation diagram illustrating one example of a TOSA and a ROSA that are included in the OSA according to the first embodiment.

FIG. 2 is an explanation diagram illustrating one example of the OSA 2 according to the first embodiment, and FIG. 3 is an explanation diagram illustrating one example of the TOSA 3 and the ROSA 4 that are included in the OSA 2 according to the first embodiment. The TOSA 3 includes an input unit 11, a light emitting unit 12, a plurality of first Polarizing Beam Splitters (PBSs) 13, an optical filter 14, a second PBS 15, a transmission port 16A, and a transmission side receptacle 16. The ROSA 4 includes a reception side receptacle 17, a reception port 17A, a polarization adjustment unit 18, a light receiving unit 19, and an output unit 20.

In addition, for convenience of description, in FIG. 2, the light traveling direction in which transmission light emitted from each of the Laser Diodes (LD) denoted by #0 to the LD denoted by #3 travels is indicated by a black triangle, and a ray of light is indicated by a solid line. Furthermore, the light traveling direction in which reception light travels is indicated by a white triangle, and a ray of light is indicated by a broken line. Regarding the definition of the polarization direction of light, a double circle indicates S polarization, and a double sided arrow indicates P polarization.

The light emitting unit 12 includes Laser Diodes (LDs) that correspond to four light emitting elements and that oscillate pieces of light having different wavelengths, that is, includes an LD 12A that is denoted by #0 and that oscillates light having a wavelength $\lambda 0$, an LD 12B that is denoted by #1 and that oscillates light having a wavelength $\lambda 1$, an LD 12C that is denoted by #2 and that oscillates light having the wavelength $\lambda 2$, and an LD 12D that is denoted by #3 and that oscillates light having a wavelength $\lambda 3$. Furthermore, for convenience of description, it is assumed that each of the LDs 12A to 12D included in the light emitting unit 12 oscillates P polarization light deflecting in a parallel direction.

The light receiving unit 19 includes Photo-Diodes (PDs) that correspond to four light receiving elements and that receive pieces of light having different wavelengths. The light receiving unit 19 includes a PD 19A that is denoted by #0 and that receives reception light having the wavelength $\lambda 0$, a PD 19B that is denoted by #1 and that receives reception light having the wavelength $\lambda 1$, a PD 19C that is denoted by #2 and that receives reception light having the wavelength $\lambda 2$, and a PD 19D that is denoted by #3 and that receives reception light having the wavelength $\lambda 3$.

The first PBS 13 is arranged between the light emitting unit 12 including the light emitting elements that differ for each wavelength and the optical filter 14 and between the light receiving unit 19 including light receiving elements that differ for each wavelength and the optical filter 14. The first PBS 13 is a polarization unit that outputs the transmission light with P polarization received from the light emitting unit 12 to the optical filter 14 and that outputs the reception light with S polarization received from the optical filter 14 to the light receiving unit 19. The first PBS 13 includes four first PBSs 13A to 13D. The first PBS 13A that is denoted by #0 and through which the light having the wavelength $\lambda 0$ passes is arranged between an optical filter F0 that is included in the optical filter 14 and the LD 12A that is denoted by #0 and between the optical filter F0 that is included in the optical filter 14 and the PD 19A that is denoted by #0. The first PBS 13B that is denoted by #1 through which the light having the wavelength $\lambda 1$ passes is arranged between the optical filter F1 that is included in the optical filter 14 and the LD 12B that is denoted by #1 and between the optical filter F1 that is included in the optical filter 14 and the PD 19B that is denoted by #1. The first PBS 13C that is denoted by #2 and through which the light having the wavelength $\lambda 2$ passes is arranged between the optical filter F2 that is included in the optical filter 14 and the LD 12C that is denoted by #2 and between the optical filter F2 that is included in the optical filter 14 and the PD 19C that is denoted by #2. The first PBS 13D that is denoted by #3 and through which the light having the wavelength λ3 passes is arranged between a reflective mirror 14A that is included in the optical filter 14 and the LD 12D that is denoted by #3 and between the reflective mirror 14A that is included in the optical filter 14 and the PD 19D that is denoted by #3. The first PBS 13 allows the optical component with P polarization to pass through, and outputs the optical component with P polarization by bending the light traveling direction by 90 degrees. In other words, when the optical component with P polarization received from each of the LDs 12A to 12D is incident into the respective first PBSs 13A to 13D, each of the first PBSs 13A to 13D allows the optical component with P polarization to pass through and outputs the optical component with P polarization to the optical filter 14. Furthermore, when the optical component with S polarization sent from the optical filter 14 is incident into the first PBS 13, the first PBS 13 outputs the optical component with S polarization to each of the PDs 19A to 19D by bending the light traveling direction of the optical component with S polarization by 90 degrees.

The optical filter 14 is an optical wavelength filter that functions as an optical multiplexing element with respect to the transmission light and that functions as an optical demultiplexing element with respect to the reception light. The optical filter 14 is constituted by optical elements formed by using a technology of a dielectric multilayer film or diffraction grating. The optical filter 14 includes, as described above, the optical filters F0, F1, and F2 having the transmission bands with respect to the respective wavelengths λ0, λ1, and λ2 and the reflective mirror 14A. Moreover, the optical filter F0 transmits the light (λ) having the wavelength included in the transmission band, and reflects the light having the other wavelengths (λ1, λ2, and λ3) that are excluded from the transmission band. The optical filter F1 transmits the light (λ1) having the wavelength that is included in the transmission band and reflects the light having the other wavelengths (λ2 and λ3) that are excluded from the transmission band. The optical filter F3 transmits the light (λ2) having the wavelength that is included in the transmission band, and reflects the light having the other wavelength (λ3) that is excluded from the transmission band. The reflective mirror 14A reflects the light having all of the wavelengths of the wavelengths λ0 to λ3, and bends the traveling direction of light to each of the optical filters F0 to F2 or the first PBS 13D. In this way, a propagation path of light is formed in the optical filter 14 by the optical filters F0 to F2 and the reflective mirror 14A that constitute the optical filter 14. The optical filter 14 is able to implement "multiplexing" and "demultiplexing" by simply inversing the direction of travel of the light. The optical filter 14 multiplexes the pieces of transmission light having the wavelengths λ0 to λ3 received from the respective first PBSs 13A to 13D that are denoted by #0 to #3, respectively, and outputs the multiplexed transmission light to the second PBS 15. Furthermore, the optical filter 14 demultiplexes the reception light received from the second PBS 15 into the pieces of reception light having the wavelengths λ0 to λ3, and outputs the pieces of demultiplexed reception light to the first PBSs 13A to 13D that are denoted by #0 to #3, respectively.

Figure 4:
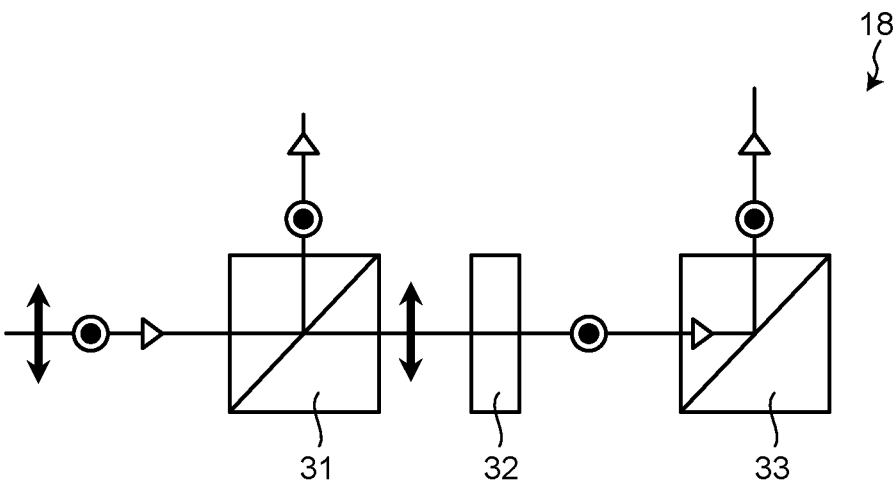
FIG. 4 is an explanation diagram illustrating one example of a polarization adjustment unit.

The polarization adjustment unit 18 is an optical element part that aligns the polarization direction of the reception light with random polarization received from the reception port 17A with S polarization. The reception light with random polarization mentioned here is reception light including, for example, S polarization and P polarization traveling in random polarization directions. FIG. 4 is an explanation diagram illustrating one example of the polarization adjustment unit 18. The polarization adjustment unit 18 illustrated in FIG. 4 includes a PBS 31, a λ/2 wavelength plate 32, and a total reflection mirror 33. Furthermore, for convenience of description, the polarization adjustment unit 18 illustrated in FIG. 4 has a structure in which beams are propagated in dual beams.

When the light in the random polarization direction is incident from the left side illustrated in FIG. 4 into the PBS 31, the PBS 31 transmits the component of polarized light with P polarization without any change and outputs the component of the light to the λ/2 wavelength plate 32, whereas the PBS 31 outputs the component of polarized light with S polarization by reflecting the light after bending the traveling direction of the light by 90 degrees. When the light with P polarization passing through the PBS 31 is incident into the λ/2 wavelength plate 32, the λ/2 wavelength plate 32 rotates the polarization direction of light with P polarization by 90 degrees, converts the light with P polarization to light with S polarization, and outputs the converted light with S polarization to the total reflection mirror 33. The total reflection mirror 33 outputs the light with S polarization received from the λ/2 wavelength plate 32 by reflecting the light after bending the traveling direction of the light by 90 degrees.

The polarization adjustment unit 18 has a structure in which the light with S polarization reflected by the PBS 31 and the light with S polarization reflected by the total reflection mirror 33 are output as parallel rays. In other words, the polarization adjustment unit 18 is able to align the light with random polarization to linearly polarized light (S polarization). Furthermore, the polarization adjustment unit 18 may also use the PBS instead of the total reflection mirror 33, and appropriate modifications are possible.

The second PBS 15 outputs the light with S polarization by bending the traveling direction of the light with S polarization by 90 degrees and also passes and outputs the light with P polarization. In other words, the second PBS 15 passes the transmission light with P polarization received from the optical filter 14 through the transmission port 16A and outputs the transmission light. Furthermore, the second PBS 15 outputs the reception light with S polarization received from the polarization adjustment unit 18 to the optical filter 14 by bending the light traveling direction of the reception light with S polarization by 90 degrees.

An operation of the optical module 1 according to the first embodiment will be described. Each of the LDs denoted by #0 to #3 outputs the transmission light with P polarization having a different wavelength to the first PBS 13 in accordance with the electrical signal received from the input unit 11. The first PBSs 13 denoted by #0 to #3 output the respective pieces of transmission light with P polarization having respective wavelengths to the optical filter 14. The optical filter 14 multiplexes the transmission light with P polarization having each of the wavelengths λ0 to λ3 received from the first PBSs 13 associated with #0 to #3, and outputs the multiplexed transmission light with P polarization to the second PBS 15. The second PBS 15 passes the multiplexed transmission light with P polarization and outputs the multiplexed transmission light with P polarization to the transmission side optical fiber 6A via the transmission port 16A.

Furthermore, the polarization adjustment unit 18 converts the reception light with random polarization received from the reception port 17A that is optically connected to the reception side optical fiber 6B to the reception light with S polarization, and outputs the converted reception light with S polarization to the second PBS 15. The second PBS 15 outputs the reception light with S polarization to the optical filter 14 by bending the light traveling direction of the reception light with S polarization by 90 degrees. The optical filter 14 demultiplexes the reception light with S polarization to the pieces of reception light with S polarization having the respective wavelengths λ0 to λ3, and outputs the demultiplexed reception light with S polarization to the associated first PBSs 13A to 13D. The first PBSs 13A to 13D that are denoted by #0 to #3, respectively, output the reception light with S polarization to the PDs 19A to 19D that are denoted by #0 to #3, respectively, in accordance with the respective wavelengths by bending the light traveling direction of the reception light with S polarization by 90 degrees. Then, each of the PDs 19A to 19D denoted by #0 to #3 converts the reception light with S polarization to an electrical signal, and outputs the converted electrical signal to the output unit 20.

The OSA 2 according to the first embodiment allows the relationship between the polarization direction of the transmission light and the polarization direction of the reception light to have an orthogonal relationship, and is able to perform, by using the single optical filter 14, optical multiplexing that is needed for the transmission light and optical demultiplexing that is needed for the reception light, so that it is possible to reduce the mounting area of the optical parts that are used for optical multiplexing and optical demultiplexing performed in the OSA 2. In addition, there is no need to arrange an optical demultiplexing element in the ROSA 4 as a result of arranging the optical filter 14 that is shared for the optical multiplexing and the optical demultiplexing performed in the TOSA 3, so that it is possible to reduce the area of the optical demultiplexing element to be mounted in the ROSA 4. As a result of this, it is possible to expand the substrate area of the control circuit 5 included in the optical module 1.

Furthermore, in the optical module 1 according to the first embodiment, the structure has been constituted such that, in the case where the polarization direction of the transmission light is P polarization, the polarization direction of the reception light is aligned with S polarization in the polarization adjustment unit 18.

In the TOSA 3, the structure has been constituted such that the first PBS 13, the optical filter 14, and the second PBS 15 are arranged as a straight-line arrangement on the optical path between the light emitting unit 12 and the transmission side optical fiber 6A. As a result of this, it is possible to easily perform alignment work that is performed in order to reduce a loss of optical power when the transmission light is output from the light emitting unit 12 to the transmission side optical fiber 6A.

By focusing on the state in which the structure of parts of the optical multiplexing element provided inside the TOSA 3 and the parts of the optical demultiplexing element provided inside the ROSA 4 are the same and the traveling directions of the incident light are opposite each other, it is possible to distinguish between the transmission light and the reception light by allowing the relationship between the polarization direction of the transmission light and the polarization direction of the reception light to have an orthogonal relationship. Furthermore, by using the optical filter 14 that uses the optical multiplexing element and the optical demultiplexing element in a shared manner, it is possible to reduce the number of optical demultiplexing elements included in the ROSA 4, and it is thus possible to reduce the total area of the optical parts included in the optical module 1.

Regarding the internal configuration of the optical module 1 constituted by using the OSA 2, it is possible to expand the substrate area of the control circuit 5 corresponding to the shaded area X in accordance with the reduction in the area of the OSA 2 illustrated in FIG. 1. Furthermore, by using the optical filter 14 that is shared by optical multiplexing and optical demultiplexing and by reducing the size of the optical parts, it is possible to contribute to an expansion of the substrate area of the control circuit 5. As a result of this, it is possible to alleviate constraint of the scale of the control circuit 5 and the size of parts to be mounted. A contribution to the expansion of the area varies depending on development of the technology of assembling the TOSA 3 and the ROSA 4 and the technology of manufacturing optical element, and thus, although avoiding affirmative expression, it is possible to reduce the area of the ROSA 4 by roughly about 50% to 80% what they used to be.

The area of the housing portions of the conventionally used TOSA and the ROSA is about, for example, 2 cm×0.7 cm=1.4 cm², whereas, in the case of an optical module of the QSFP module, although various layouts are conceivable, the substrate area of the control circuit is about 2.5 cm×1.6 cm=4 cm². In contrast, in the OSA 2 according to the first embodiment, in the case where the area of the ROSA 4 can be reduced by about 50% to 80%, the ROSA 4 is reduced from, for example, 1.4 cm² to about 0.7 cm² to 0.28 cm². At this time, the substrate area of the control circuit 5 is able to be expanded by about 18% to 28% from the conventional size of 4 cm² to 4.7 cm² to 5.12 cm².

Moreover, the polarization adjustment unit 18 according to the first embodiment has been constituted, as an example, illustrated in FIG. 4, but the example is not limited to this. A polarization adjustment unit 18A illustrated in FIG. 5 or a polarization adjustment unit 18B illustrated in FIG. 6 may be used, and appropriate modifications are possible.

Figure 5:
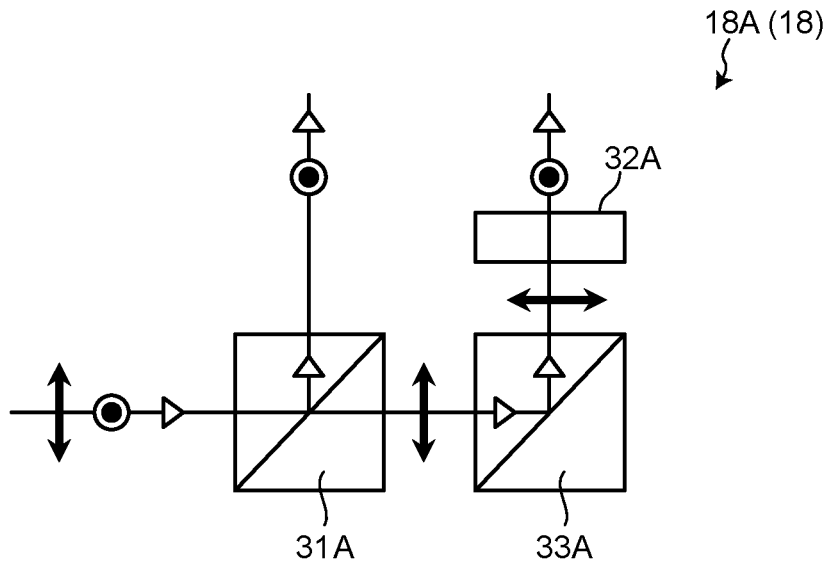
FIG. 5 is an explanation diagram illustrating one example of another polarization adjustment unit.

FIG. 5 is an explanation diagram illustrating one example of the polarization adjustment unit 18A as another example. Furthermore, for convenience of description, the polarization adjustment unit 18A illustrated in FIG. 5 has a structure in which beams are propagated in dual beams. The polarization adjustment unit 18A illustrated in FIG. 5 is different from the polarization adjustment unit 18 illustrated in FIG. 4 in that a position in which the λ/2 wavelength plate 32 is arranged is different and the polarization adjustment unit 18A includes a PBS 31A, a total reflection mirror 33A, and a λ/2 wavelength plate 32A. When the light with random polarization is incident into the PBS 31A, the PBS 31A passes the component of polarized light with P polarization without any change and outputs the component of polarized light with P polarization to the total reflection mirror 33A, whereas the PBS 31A outputs the component of polarized light with S polarization by bending the traveling direction of the light by 90 degrees. The total reflection mirror 33A outputs the light with P polarization to the λ/2 wavelength plate 32A by bending the light traveling direction of the light with P polarization by 90 after reflecting the light. When the light with P polarization passing through the total reflection mirror 33A is incident into the λ/2 wavelength plate 32A, the λ/2 wavelength plate 32A rotates the polarization direction of light with P polarization by 90 degrees, and converts the light with P polarization to the light with S polarization. Then, in the polarization adjustment unit 18A, the light with S polarization reflected by the PBS 31A and the light with S polarization passing through the λ/2 wavelength plate 32A are output as parallel rays in a state of S polarization. In other words, the polarization adjustment unit 18A is able to align the light with random polarization to linearly polarized light (S polarization).

Figure 6:
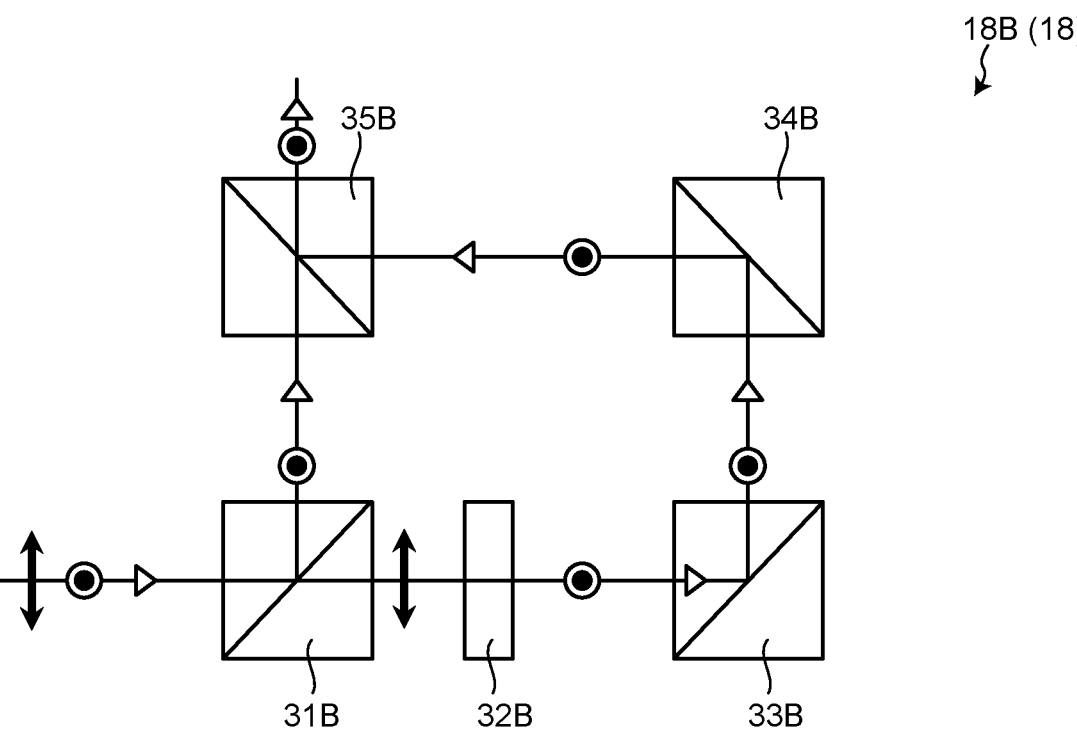
FIG. 6 is an explanation diagram illustrating one example of another polarization adjustment unit.

FIG. 6 is an explanation diagram illustrating one example of the polarization adjustment unit 18B as another example. Furthermore, for convenience of description, the polarization adjustment unit 18B illustrated in FIG. 6 is exemplified a case in which dual beams are made to a single beam by using a Polarizing Beam Combiner (PBC). The polarization adjustment unit 18B illustrated in FIG. 6 includes a PBS 31B, a $\lambda/2$ wavelength plate 32B, a first total reflection mirror 33B, a second total reflection mirror 34B, and a PBC 35B. The PBS 31B outputs, to the PBC 35B, the optical component of the light with S polarization obtained from the light with random polarization, and outputs, to the $\lambda/2$ wavelength plate 32B, the optical component of the light with P polarization obtained from the light with random polarization. The $\lambda/2$ wavelength plate 32B converts the optical component of light with P polarization to the optical component of light with S polarization by rotating the optical component of the light with P polarization by 90 degrees, and outputs the optical component of the converted light with S polarization to the first total reflection mirror 33B. The first total reflection mirror 33B outputs the optical component of the light with S polarization to the second total reflection mirror 34B by bending the light traveling direction by 90 degrees. Furthermore, the second total reflection mirror 34B outputs the optical component of light with S polarization to the PBC 35B by bending the light traveling direction by 90 degrees. The PBC 35B multiplexes the optical component of the light with S polarization received from the PBS 31B and the optical component of the light with S polarization received from the second total reflection mirror 34B, aligns the random polarization to the S polarization, and outputs the aligned optical component.

Furthermore, a case has been described as an example in which, in the optical module 1 according to the first embodiment, if the polarization direction of the transmission light is P polarization, the polarization direction of the reception light is aligned with S polarization by using the polarization adjustment unit 18, but the example is not limited to this, and appropriate modifications are possible.
The polarization direction of the transmission light may be S polarization, and the embodiment thereof will be described as a second embodiment. Furthermore, by assigning the same reference numerals to components having the same configuration as those in the optical module 1 according to the first embodiment, overlapped descriptions of the configuration and the operation thereof will be omitted.

(b) Second Embodiment

Figure 7:
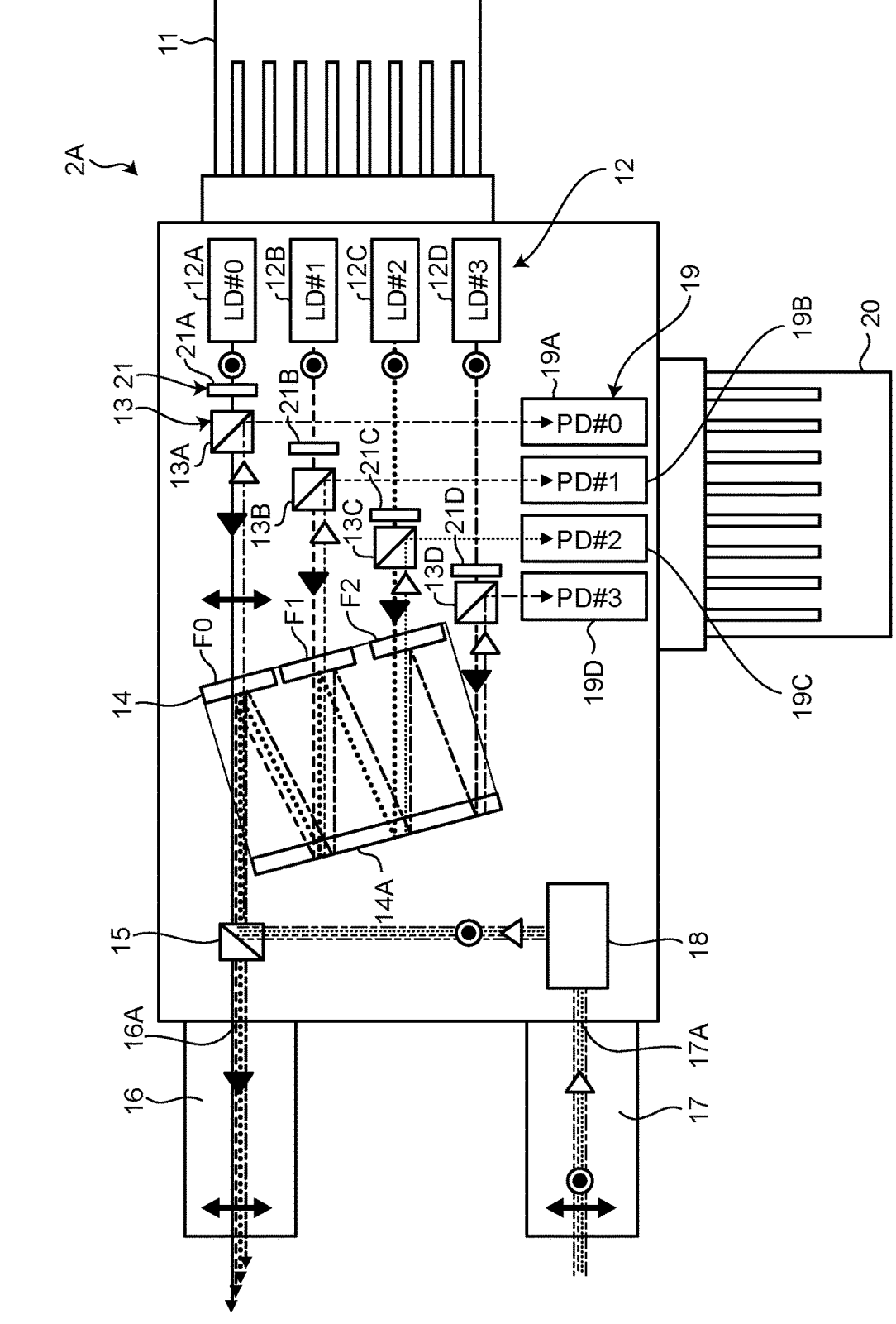
FIG. 7 is an explanation diagram illustrating one example of an OSA according to a second embodiment.

FIG. 7 is an explanation diagram illustrating one example of an OSA 2A according to the second embodiment. The OSA 2A according to the second embodiment is different from the OSA 2 according to the first embodiment in that the polarization direction of the transmission light is set to be S polarization, and each of $\lambda/2$ wavelength plates 21 is arranged on the optical path between the first PBS 13 and the light emitting unit 12.

Each of the LDs 12A to 12D denoted by #0 to #3, respectively, included in the light emitting unit 12 emits the transmission light with S polarization in the polarization direction. Each of the PDs 19A to 19D denoted by #0 to #3, respectively, included in the light receiving unit 19 receives the reception light with S polarization in the polarization direction. Each of the $\lambda/2$ wavelength plates 21 denoted by

0 to #3, respectively, rotates, as polarization rotation, the transmission light with S polarization by 90 degrees and outputs the transmission light with P polarization to the first PBS 13. A $\lambda/2$ wavelength plate 21A denoted by #0 is arranged between the LD 12A denoted by #0 and the first PBS 13A denoted by #0, converts the transmission light with S polarization having the wavelength $\lambda0$ received from the LD 12A denoted by #0 to the transmission light with P polarization, and outputs the converted transmission light with P polarization having the wavelength $\lambda0$ to the first PBS 13B denoted by #1. A $\lambda/2$ wavelength plate 21B denoted by #1 is arranged between the LD 12B denoted by #1 and the first PBS 13B denoted by #1, converts the transmission light with S polarization having the wavelength $\lambda1$ received from the LD 12B denoted by #1 to the transmission light with P polarization, and outputs the converted transmission light with P polarization having the wavelength $\lambda1$ to the first PBS 13B denoted by #1. A $\lambda/2$ wavelength plate 21C denoted by #2 is arranged between the LD 12C denoted by #2 and the first PBS 13C denoted by #2, converts the transmission light with S polarization having the wavelength $\lambda2$ received from the LD 12C denoted by #2 to the transmission light with P polarization, and outputs the converted transmission light with P polarization having the wavelength $\lambda2$ to the first PBS 13C denoted by #2. A $\lambda/2$ wavelength plate 21D denoted by #3 is arranged between the LD 12D denoted by #3 and the first PBS 13D denoted by #3, converts the transmission light with S polarization having the wavelength $\lambda3$ received from the LD 12D denoted by #3 to the transmission light with P polarization, and outputs the converted transmission light with P polarization having the wavelength $\lambda3$ to the first PBS 13D denoted by #3.

Each of the first PBSs 13A to 13D denoted by #0 to #3, respectively, passes the transmission light with P polarization because the transmission light is P polarized light, and outputs the transmission light to the optical filter 14. Then, the optical filter 14 multiplexes the transmission light with P polarization that has passed through each of the first PBSs 13A to 13D denoted by #0 to #3, respectively, and outputs the multiplexed transmission light with P polarization to the second PBS 15. Then, the second PBS 15 passes the multiplexed transmission light with P polarization to the transmission side optical fiber 6A by way of the transmission port 16A.

Furthermore, the polarization adjustment unit 18 polarizes the reception light with random polarization received from the reception port 17A that is connected to the reception side optical fiber 6B to the reception light with S polarization, and outputs the reception light with S polarization to the second PBS 15. The second PBS 15 bends the light traveling direction of the reception light with S polarization by 90 degrees because the reception light is S polarized light, and outputs the reception light to the optical filter 14. Then, when the optical filter 14 allows the reception light with S polarization to pass, the optical filter 14 demultiplexes the pieces of reception light with S polarization having the respective wavelengths, and outputs the pieces of reception light having the respective wavelengths to the first PBSs 13A to 13D denoted by #0 to #3, respectively, for each wavelength. Each of the first PBSs 13A to 13D denoted by #0 to #3, respectively, bends the light traveling direction of the reception light with S polarization by 90 degrees because the reception light is S polarized light, and outputs the PDs 19A to 19D denoted by #0 to #3, respectively, that are associated with the respective wavelengths.

The OSA 2A according to the second embodiment allows the relationship between the polarization direction of the transmission light and the polarization direction of the reception light to have an orthogonal relationship, and is able to perform, by using the single optical filter 14, optical multiplexing that is needed for the transmission light and optical demultiplexing that is needed for the reception light, so that it is possible to reduce the mounting area of the optical parts that are used for optical multiplexing and optical demultiplexing performed in the OSA 2A. There is no need to arrange an optical demultiplexing element in the ROSA 4 as a result of arranging the optical filter 14 that is shared for the optical multiplexing and the optical demultiplexing performed in the TOSA 3, so that it is possible to reduce the area of the optical demultiplexing element to be mounted in the ROSA 4. As a result of this, it is possible to expand the substrate area of the control circuit 5 included in the optical module 1.

Furthermore, a case has been described as an example in which, in the OSA 2 (2A) according to the first and the second embodiment, four wave multiplexing using four wavelengths is performed, but the example is not limited to four wave multiplexing, and, for example, it is also applicable to a multichannel optical module that performs eight wave multiplex having eight wavelengths or n wave multiplex having n wavelengths.

Figure 8:
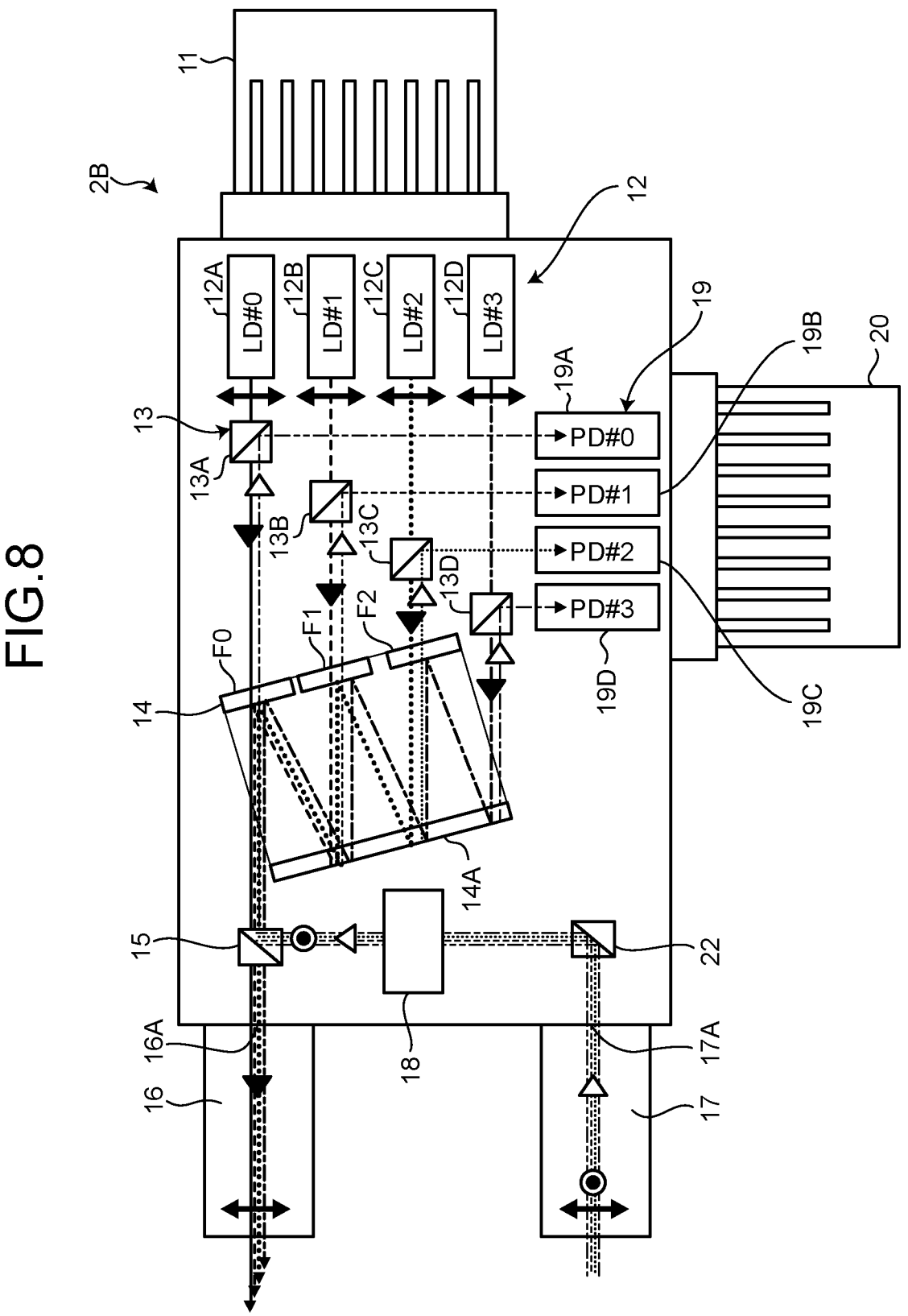
FIG. 8 is an explanation diagram illustrating one example of an OSA according to a third embodiment.
Figure 12:
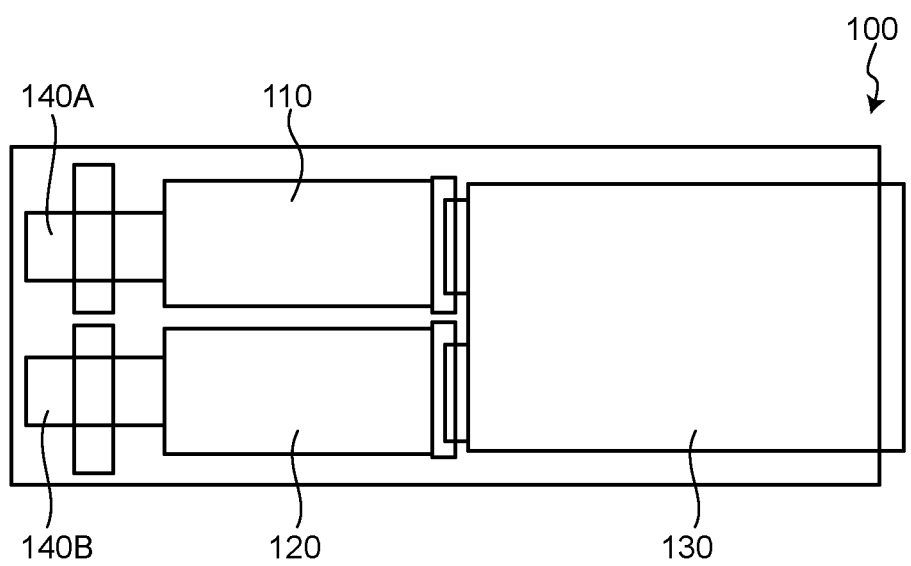
FIG. 12 is an explanation diagram illustrating one example of an optical module.

Furthermore, a case has been described as an example in which, in the OSA 2 according to the first embodiment, the light emitting unit 12, the first PBS 13, the optical filter 14, and the second PBS 15 are mounted in the interior of the TOSA 3, whereas the polarization adjustment unit 18 and the light receiving unit 19 are mounted in the interior of the ROSA 4. However, it may be possible to mount the light emitting unit 12, the first PBS 13, the optical filter 14, the second PBS 15, and the polarization adjustment unit 18 in the interior of the TOSA 3, and an embodiment thereof will be described below as a third embodiment. FIG. 8 is an explanation diagram illustrating one example of an OSA 2B according to the third embodiment. Furthermore, by assigning the same reference numerals to components having the same configuration as those in the optical module 1 according to the first embodiment, overlapped descriptions of the configuration and the operation thereof will be omitted.

(c) Third Embodiment

The OSA 2 according to the first embodiment illustrated in FIG. 2 is different from the OSA 2B according to the third embodiment illustrated in FIG. 8 in that the polarization adjustment unit 18 is included in a TOSA 3B, and a total reflection mirror 22 is provided in the interior of a ROSA 4B in addition to the light receiving unit 19. The total reflection mirror 22 bends the light traveling direction of the reception light with random polarization received from the reception port 17A that is connected to the reception side optical fiber 6B by 90 degrees and reflects the bent reception light at the polarization adjustment unit 18 that is included in the TOSA 3. The polarization adjustment unit 18 polarizes the reception light with random polarization reflected by the total reflection mirror 22 to the reception light with S polarization, and outputs the polarized reception light with S polarization to the second PBS 15.

The OSA 2B according to the third embodiment allows the relationship between the polarization direction of the transmission light and the polarization direction of the reception light to have an orthogonal relationship, and is able to perform, by using the single optical filter 14, optical multiplexing that is needed for the transmission light and optical demultiplexing that is needed for the reception light, so that it is possible to reduce the mounting area of the optical parts that are used for optical multiplexing and optical demultiplexing performed in the OSA 2B. There is no need to arrange an optical demultiplexing element and the polarization adjustment unit 18 in the ROSA 4B as a result of arranging the optical filter 14 that is shared for the optical multiplexing and the optical demultiplexing performed in the TOSA 3B, so that it is possible to reduce the area of the optical demultiplexing element to be mounted in the ROSA 4B. As a result of this, it is possible to expand the substrate area of the control circuit 5 included in the optical module 1.

Figure 10:
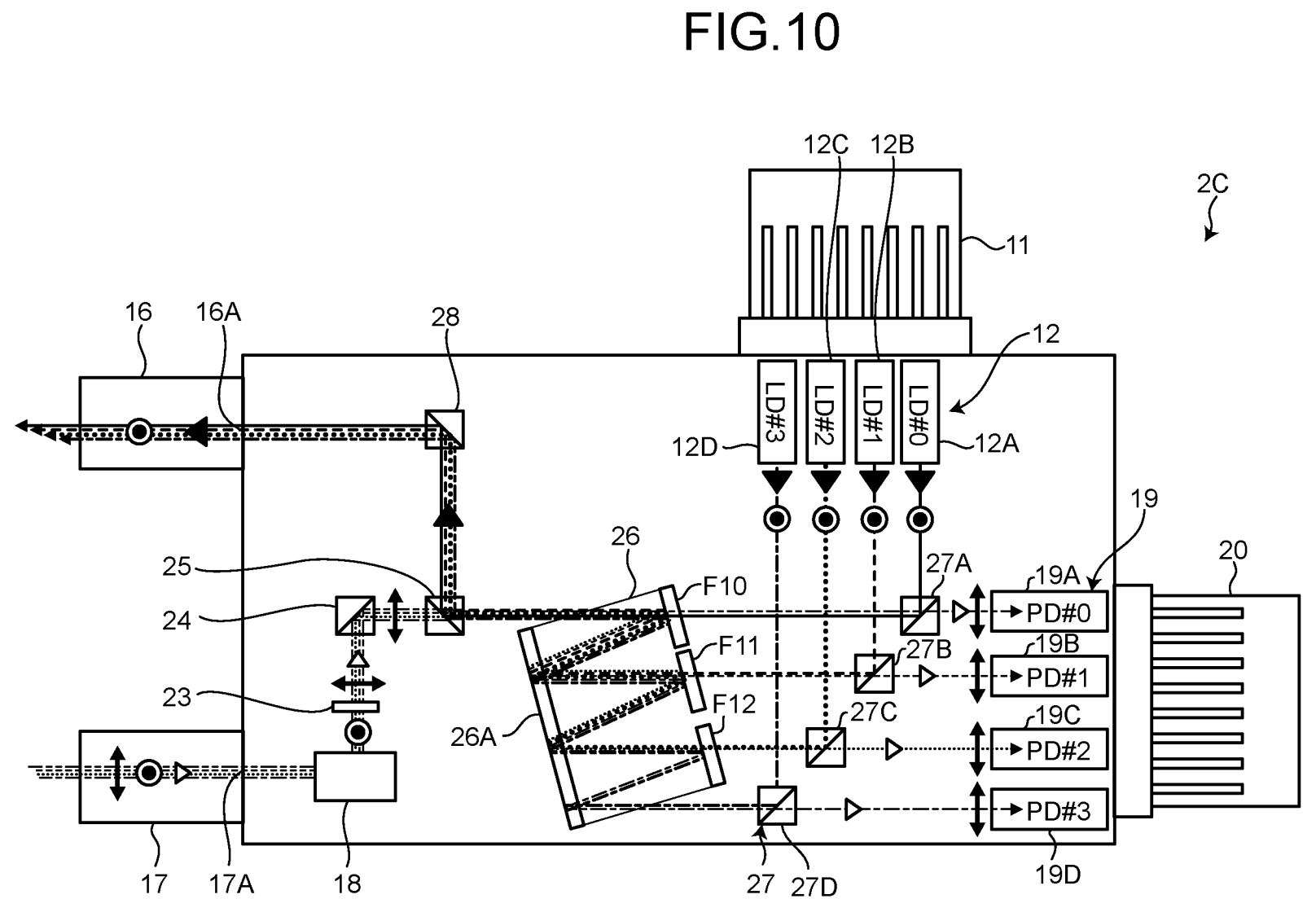

Furthermore, a case has been described as an example in which, in the OSA 2 according to the first embodiment, the optical filter 14 included in the TOSA 3 is shared with the ROSA 4, but the example is not limited to this, and appropriate modifications are possible. Accordingly, an embodiment thereof will be described below as a fourth embodiment. FIG. 10 is an explanation diagram illustrating one example of an OSA 2C according to the fourth embodiment. Furthermore, by assigning the same reference numerals to components having the same configuration as those in the optical module 1 according to the first embodiment, overlapped descriptions of the configuration and the operation thereof will be omitted.

(d) Fourth Embodiment

The OSA 2 according to the first embodiment is different from the OSA 2C according to the fourth embodiment in that an optical filter 26 is arranged in the interior of a ROSA 4C, and the optical filter 26 included in the ROSA 4C is shared with a TOSA 3C. The TOSA 3C included in the OSA 2C illustrated in FIG. 10 includes the input unit 11, the light emitting unit 12, and a second total reflection mirror 28. The ROSA 4C included in the OSA 2C includes the polarization adjustment unit 18, a λ/2 wavelength plate 23, a first total reflection mirror 24, a third PBS 25, the optical filter 26, a plurality of fourth PBSs 27, and the light receiving unit 19.

Each of the LDs 12A to 12D denoted by #0 to #3, respectively, included in the light emitting unit 12 emits the transmission light travelling in the polarization direction of S polarization. Each of the PDs 19A to 19D denoted by #0 to #3, respectively, included in the light receiving unit 19 receives the reception light travelling in the polarization direction of P polarization. The fourth PBS 27 is arranged between the light emitting unit 12 and the optical filter 26, and also between the light receiving unit 19 and the optical filter 26. A fourth PBS 27A that is denoted by #0 and through which light having the wavelength λ0 passes is arranged between the optical filter F10 included in the optical filter 26 and the LD 12A denoted by #0, and between the optical filter F10 included in the optical filter 26 and the PD 19A denoted by #0. A fourth PBS 27B that is denoted by #1 and through which light having the wavelength λ1 passes is arranged between the optical filter F11 included in the optical filter 26 and the LD 12B denoted by #1, and between the optical filter F11 included in the optical filter 26 and the PD 19B denoted by #1. A fourth PBS 27C that is denoted by #2 and through which the light having the wavelength λ2 passes is arranged between the optical filter F12 included in the optical filter 26 and the LD 12C denoted by #2, and between the optical filter F12 included in the optical filter 26 and the PD 19C denoted by #2. A fourth PBS 27D that is denoted by #3 and through which the light having the wavelength λ3 passes is arranged between a reflective mirror 26A included in the optical filter 26 and the LD 12D denoted by #3, and between the reflective mirror 26A included in the optical filter 26 and the PD 19D denoted by #3. The fourth PBS 27 passes the optical component with P polarization, bends the light traveling direction of the optical component with S polarization by 90 degrees, and outputs the bent optical component. In other words, when the optical component with S polarization received from the LDs 12A to 12D denoted by #0 to #3, respectively, is incident into each of the fourth PBSs 27A to 27D denoted by #0 to #3, respectively, each of the fourth PBSs 27A to 27D denoted by #0 to #3, respectively, bends the light traveling direction of the optical component with S polarization by 90 degrees, and outputs the optical component with S polarization to the optical filter 26. Furthermore, each of the fourth PBSs 27A to 27D denoted by #0 to #3, respectively, passes the transmission light with P polarization having each of the wavelengths received from the optical filter 26, and outputs the transmission light with P polarization having the associated wavelength to the PDs 19A to 19D denoted by #0 to #3, respectively.

The optical filter 26 is an optical wavelength filter that functions as an optical multiplexing element with respect to the transmission light and that functions as an optical demultiplexing element with respect to the reception light. The optical filter 26 multiplexes the pieces of transmission light with S polarization having the respective wavelengths λ0 to λ3 received from the fourth PBSs 27A to 27D that are denoted by #0 to #3, respectively, and outputs the multiplexed transmission light to the third PBS 25. Furthermore, the optical filter 26 demultiplexes the reception light received from the third PBS 25 to the pieces of reception light having the respective wavelengths λ0 to λ3, and outputs the pieces of demultiplexed reception light to the associated fourth PBSs 27A to 27D denoted by #0 to #3, respectively.

The polarization adjustment unit 18 aligns the polarization direction of the reception light sent from the reception port 17A connected to the reception side optical fiber 6B with the S polarization, and outputs the reception light that has been aligned with S polarization to the λ/2 wavelength plate 23. The λ/2 wavelength plate 23 converts the reception light with S polarization to the reception light with P polarization, and outputs the converted reception light with P polarization to the first total reflection mirror 24. The first total reflection mirror 24 outputs the reception light with P polarization to the third PBS 25 by bending the light traveling direction of the reception light with P polarization by 90 degrees. The third PBS 25 passes the signal light with P polarization, and outputs the signal light with S polarization by bending the light traveling direction of the signal light with S polarization by 90 degrees. In other words, the third PBS 25 outputs the reception light with P polarization to the optical filter 26, and outputs the transmission light with S polarization sent from the optical filter 26 to the second total reflection mirror 28.

An operation of the optical module 1 according to the fourth embodiment will be described. The LDs 12A to 12D that are denoted by #0 to #3, respectively, and that are included in the light emitting unit 12 output, in accordance with the electrical signal sent from the input unit 11, the pieces of transmission light with S polarization having the respective wavelengths to the respective fourth PBSs 27A to 27D. The fourth PBSs 27A to 27D denoted by #0 to #3, respectively, output the pieces of transmission light with S polarization having the respective wavelengths to the optical filter 26. The optical filter 26 multiplexes the pieces of transmission light with S polarization having the respective wavelengths λ0 to λ3 received from the fourth PBSs 27A to 27D denoted by #0 to #3, respectively, and outputs the multiplexed transmission light with S polarization to the third PBS 25. The third PBS 25 outputs the multiplexed transmission light with S polarization to the second total reflection mirror 28 by bending the light traveling direction of the transmission light with S polarization by 90 degrees. The second total reflection mirror 28 outputs the transmission light with S polarization sent from the third PBS 25 to the transmission side optical fiber 6A by way of the transmission port 16A.

Furthermore, the polarization adjustment unit 18 converts the reception light with random polarization received from the reception port 17A that is optically connected to the reception side optical fiber 6B to the reception light with S polarization, and outputs the converted reception light with S polarization to the λ/2 wavelength plate 23. The λ/2 wavelength plate 23 converts the reception light with S polarization sent from the polarization adjustment unit 18 to the reception light with P polarization by rotating the reception light with S polarization by 90 degrees, and outputs the converted reception light with P polarization to the first total reflection mirror 24. The first total reflection mirror 24 outputs the converted reception light with P polarization to the third PBS 25 by bending the light traveling direction by 90 degrees.

The third PBS 25 outputs the reception light with P polarization to the optical filter 26. The optical filter 26 demultiplexes the reception light with P polarization to the pieces of reception light with P polarization having the respective wavelengths λ0 to λ3, and outputs the demultiplexed reception light with P polarization to the fourth PBSs 27A to 27D, respectively. the fourth PBSs 27A to 27D denoted by #0 to #3, respectively, passes the reception light with P polarization and outputs the reception light with P polarization to each of the PDs 19A to 19D denoted by #0 to #3, respectively, in accordance with the wavelength. Then, each of the PDs 19A to 19D denoted by #0 to #3, respectively, converts the reception light with P polarization to an electrical signal, and outputs the converted electrical signal to the output unit 20.

The OSA 2C according to the fourth embodiment allows the relationship between the polarization direction of the transmission light and the polarization direction of the reception light to have an orthogonal relationship, and is able to perform, by using the optical filter 26 included in the ROSA 4C, optical multiplexing that is needed for the transmission light and optical demultiplexing that is needed for the reception light, so that it is possible to reduce the mounting area of the optical parts that are used for optical multiplexing and optical demultiplexing. In other words, there is no need to arrange an optical multiplexing element included in the TOSA 3C by arranging the optical filter 26 that is shared for the optical multiplexing and the optical demultiplexing in the ROSA 4C, so that it is possible to reduce the area of the optical multiplexing element to be mounted in the TOSA 3C. As a result of this, it is possible to expand the substrate area of the control circuit 5 included in the optical module 1.

According to an aspect of an embodiment, downsizing is implemented by reducing the number of optical components.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising:
a light emitter that emits transmission light that is in a first linearly polarized light state;
a light receiver that receives reception light;
a transmission port that outputs the transmission light;
a reception port that inputs the reception light;
a polarization adjuster that polarizes the reception light received from the reception port to a second linearly polarized light state that has an orthogonal relationship with the first linearly polarized light state;
an optical filter that outputs the transmission light that has been received from the light emitter and that is in the first linearly polarized light state by allowing the transmission light to propagate through inside a propagation path, and that outputs the reception light that has been received from the polarization adjuster and that is in the second linearly polarized light state by allowing the reception light to propagate through inside the propagation path; and
a polarizer that is arranged between the optical filter and the light emitter and between the optical filter and the light receiver, that outputs the transmission light that has been received from the light emitter and that is in the first linearly polarized light state to the optical filter, and that outputs the reception light that has been received from the optical filter and that is in the second linearly polarized light state to the light receiver.

2. The optical device according to claim 1, wherein the light emitter
    includes a plurality of light emitting elements that differ for each wavelength, and
    emits pieces of transmission light that have different wavelengths and that are in the first linearly polarized light state,
the light receiver
    includes a plurality of light receiving elements that differ for each wavelength, and
    receives pieces of reception light that have different wavelengths,
the optical filter
    multiplexes the pieces of transmission light that have different wavelengths received from the plurality of respective light emitting elements and that are in the first linearly polarized light state, and
    demultiplexes the pieces of reception light that have different wavelengths received from the polarization adjuster and that are in the second linearly polarized light state, and
the polarizer
    includes a plurality of polarization elements that differ for each wavelength,
    outputs, by using the polarization elements that are associated with respective corresponding wavelengths and that are arranged between the optical filter and the light emitting elements and between the optical filter and the light receiving elements, the pieces of transmission light that have the respective corresponding wavelengths received from the respective light emitting elements that are in the first linearly polarized light state to the optical filter, and outputs the pieces of reception light that have the respective corresponding wavelengths received from the optical filter and that are in the second linearly polarized light state to the light receiving elements.

3. The optical device according to claim 1, wherein the light emitter includes
    a light emitting element that emits the transmission light that is in the second linearly polarized light state, and
    a wavelength plate that converts the transmission light that has been received the light emitting element and that is in the second linearly polarized light state to the transmission light that is in the first linearly polarized light state.

4. The optical device according to claim 1, further including:
    a transmitting circuit that has the light emitter, the transmission port, the optical filter, and the polarizer built in; and
    a receiving circuit that has the light receiver, the reception port, and the polarization adjuster built in.

5. The optical device according to claim 1, further including:
    a transmitting circuit that has the light emitter, the transmission port, the optical filter, the polarization adjuster, and the polarizer built in; and
    a receiving circuit that has the light receiver and the reception port built in.

6. The optical device according to claim 1, wherein the polarizer and the optical filter are arranged on a straight line of an optical path between the light emitter and the transmission port.

7. The optical device according to claim 1, further including
    a wavelength plate that converts the reception light that has been received from the polarization adjuster and that is in the second linearly polarized light state to the reception light that is in the first linearly polarized light state, wherein
    the optical filter outputs the transmission light that has been received from the light emitter and that is in the first linearly polarized light state by allowing the transmission light to propagate through inside the propagation path, and outputs the reception light that has been received from the wavelength plate and that is in the second linearly polarized light state by allowing the reception light to propagate through inside the propagation path.

8. An optical module comprising:
an optical device that includes a transmitting circuit that transmits transmission light and a receiving circuit that receives reception light; and
a control circuit that controls the optical device, wherein the optical device includes
    a light emitter that emits the transmission light that is in a first linearly polarized light state,
    a light receiver that receives the reception light,
    a transmission port that outputs the transmission light,
    a reception port that inputs the reception light;
    a polarization adjuster that polarizes the reception light received from the reception port to a second linearly polarized light state that has an orthogonal relationship with the first linearly polarized light state,
    an optical filter that outputs the transmission light that has been received from the light emitter and that is in the first linearly polarized light state by allowing the transmission light to propagate through inside a propagation path, and that outputs the reception light that has been received from the polarization adjuster and that is in the second linearly polarized light state by allowing the reception light to propagate through inside the propagation path, and a polarizer that is arranged between the optical filter and the light emitter and between the optical filter and the light receiver, that outputs the transmission light that has been received from the light emitter and that is in the first linearly polarized light state to the optical filter, and that outputs the reception light that has been received from the optical filter and that is in the second linearly polarized light state to the light receiver.

9. The optical module according to claim 8, wherein the transmitting circuit has the light emitter, the transmission port, the optical filter, and the polarizer built in, and the receiving circuit has the light receiver, the reception port, and the polarization adjuster built in.

10. The optical module according to claim 8, wherein the transmitting circuit has the light emitter, the transmission port, the optical filter, the polarization adjuster, and the polarizer built in, and the receiving circuit has the light receiver and the reception port built in.

\*   \*   \*   \*   \*